(12) United States Patent
Meyers

(10) Patent No.: US 8,669,861 B1
(45) Date of Patent: Mar. 11, 2014

(54) METHOD FOR ESTABLISHING A RISK PROFILE USING RFID TAGS

(75) Inventor: Richard C. Meyers, Arlington, VA (US)

(73) Assignee: GlobalTrak, LLC, Arlington, VA (US)

( * ) Notice: Subject to any disclaimer, the term of this patent is extended or adjusted under 35 U.S.C. 154(b) by 231 days.

(21) Appl. No.: 13/343,999

(22) Filed: Jan. 5, 2012

Related U.S. Application Data

(60) Provisional application No. 61/430,338, filed on Jan. 6, 2011.

(51) Int. Cl.
*G08B 1/08* (2006.01)

(52) U.S. Cl.
USPC .................. 340/539.1; 340/572.1; 340/572.4; 702/174; 702/175

(58) Field of Classification Search
USPC ............. 340/539.1, 572.1, 572.4, 572.8, 666, 340/673, 5.1; 235/384, 487; 177/136, 45; 702/101, 173, 174, 175
See application file for complete search history.

(56) References Cited

U.S. PATENT DOCUMENTS

| | | | | |
|---|---|---|---|---|
| 7,305,324 | B2 * | 12/2007 | Beshears et al. | 702/173 |
| 7,375,293 | B2 * | 5/2008 | Beshears et al. | 177/25.13 |
| 8,364,439 | B2 * | 1/2013 | Mintz et al. | 702/173 |
| 2003/0042304 | A1 * | 3/2003 | Knowles et al. | 235/384 |
| 2003/0080192 | A1 * | 5/2003 | Tsikos et al. | 235/462.14 |

* cited by examiner

*Primary Examiner* — Toan N Pham

(57) ABSTRACT

A system and method for establishing a weight related risk profile using RFID technology is provided. While the cargo container is in transit, a RFID reader inside a cargo container polls the contents of the container by reading RFID data from each RFID tagged item and calculate the payload weight. When the truck transporting the cargo container passes a weigh station, or a high-speed scale embedded in the road, a payload weight is measured by a scale. A risk factor is assessed by comparing the estimated weight by the RFID reader with the measured weight by the scale. According to one aspect of the invention, the RFID based polling system has the ability to map the weight and location for each tagged item and estimate a container weight distribution. The estimated weight distribution is compared with the weight distribution measured by the scale to determine potential anomalies.

22 Claims, 3 Drawing Sheets

METHOD FOR ESTABLISHING A RISK PROFILE USING RFID TAGS

PRIORITY CLAIM

The present invention claims priority to U.S. Provisional Application No. 61/430,338, filed Jan. 6, 2011.

BACKGROUND OF THE PRESENT INVENTION

1. Field of the Present Invention

The present invention relates generally to a container security system. More particularly, the present invention relates to a method for polling the contents of a cargo container while in transit and comparing an estimated payload weight derived from REID information with a measured payload weight to detect the presence of unidentified materials in a shipment and to produce a risk profile.

2. Description of Related Art

Many states have weigh-in-motion technology that allows a continuous flow of truck weighing. Many states now use electronic bypass systems to alleviate some of the truck traffic through the weigh station called simply A.V.I. (Automatic Vehicle Identification). The system consists of the equipment at the weigh station itself, as well as a truck mounted transponder, usually placed on the inside of the windshield. These are similar to transponders used for toll collection. Each transponder is directly registered to a specific truck, and contains a unique identification. The registration process propagates information such as carrier name, unit number, and gross weight to weigh stations. In addition, the system keeps a basic safety and compliance record for each vehicle. As a truck approaches a weigh station (approximately one mile before), an electronic "reader" on a boom over the freeway reads the information from the truck transponder. At the same time, the truck is usually driving over high-speed electronic scales embedded in the road.

The system computes the weight, by axle and gross, and determines if it is within the limits. It also looks at the safety and compliance record on the database. The display shows the results to the weigh master, including the speed of the vehicle. The weigh master may have the system automatically determine if a truck needs to stop or may override the system. Approximately one-half to one full mile after passing under the "reader," the truck will pass under another boom which has an electronic unit to send the transponder a signal. If the weight and safety information are acceptable, the truck may receive a "green light" and can continue without entering the weigh station at all. When a driver receives a "red light," the truck must pull into the weigh station for the normal weigh-in procedure. The most common reason a truck is "red-lighted" is a weight problem, or a random check. Each time a truck is randomly pulled in, it is noted in the system whether the driver was compliant or not during the check. This affects how often a truck or different trucks from the same company are pulled in. For example, a company with a good compliance record may have 5% of its trucks "red-lighted." On the other hand, a company whose trucks have compliance issues during the random checks will have their information updated accordingly, and might get "red-lighted," for example, 30% of the time.

However, there remains a significant security risk not addressed by the present method used to regulate freight carrier compliance. The present weigh station system and Automatic Vehicle Identification programs lacks a method to identify at risk containers especially as trucks enter the U.S. through ports of entry.

SUMMARY OF THE PRESENT INVENTION

To address the problems and limitations noted above, the present invention seeks to integrate RFID functions with selected monitoring systems and on-board transponders or Automatic Vehicle Identification systems to provide increased container security. The present invention includes a system in which items tagged with RFID tags may be identified by OD number and weight information as well as other specific information pertaining to cargo in a given container, box, on a pallet, or cargo in general. While in transit, the RFID reader will poll cargo for ID number and weight information, send information to a controller unit which will preferably calculate payload weight from the RFID tag embedded information and store such data. Preferably, the data will be accessed during the next measuring event. A measuring event may take place during a routine weight station inspection or may be solicited by the driver during a routine stop. Then the payload weight collected by the RFID reader will be compared to the measured weight determined by scales. If the measured weights matches the RFID calculated weight, the cargo trailer will receive a low risk profile and may proceed quickly through Ports of Entry and weigh stations. Preferably, any significant discrepancies will flag a vehicle to receive a "red-light" for inspection. After a flagged vehicle and payload are physically inspected, inspecting authorities may tag untagged or improperly tagged items to account for the weight discrepancies and thereby reduce the risk profile from high risk to low risk.

The accompanying drawings, which are incorporated in and constitute part of the specification, illustrate various embodiments of the present invention and together with the description, serve to explain the principles of the present invention. For the purpose of the present invention, a monitored element is defined as any item, box, package or container having an embedded or attached RFID tag.

DESCRIPTION OF THE PREFERRED EMBODIMENTS

Figure 1:
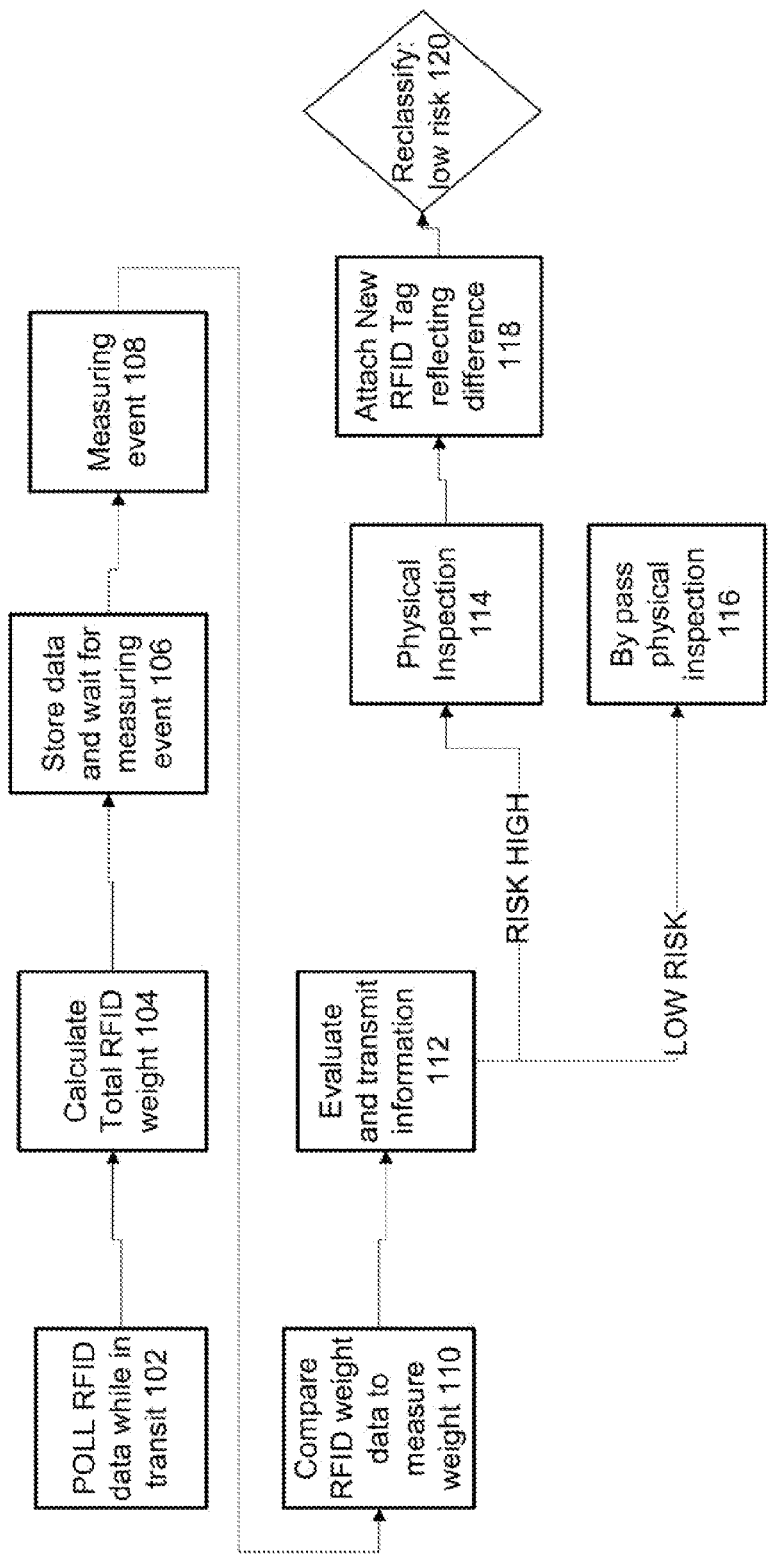
FIG. 1 is a block diagram of a method for establishing an RFID weight related risk profile in accordance with an embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program", "computer program", "software application", and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

With reference now to FIG. 1, a block diagram of a method for establishing an RFID weight related risk profile in accordance with an embodiment of the present invention will now be discussed. As shown in FIG. 1, a method according to a preferred embodiment of the present invention includes the first step of polling tagged items for RFID data while in transit 102. Thereafter, the data is collected and processed by the monitoring unit controller which calculates the total RFID weight 104. The data is then stored 106 and the system is set to wait for the next measuring event which may be taken by an on-board scale, Automatic Vehicle Identification system, standard weigh station or other means.

After the vehicle weight has been physically measured, the weight data may be automatically transmitted to a monitoring unit or manually input by driver. Thereafter, the monitoring unit may compare the RFID weight data to the physically measured weight data 110. This information is then evaluated and transmitted to the authorities and unit display screen 112.

If there are no discrepancies between the RFID weight data and the measured payload data, then the vehicle will be classified as low risk and preferably will receive a "green-light" message indicating that it may be allowed to proceed and by-pass a physical inspection 116. If however, there are discrepancies between the RFID weight data and the measured payload weight data, then a higher risk alert will trigger a "red-light" event indicating that the truck will need to undergo a physical inspection 114. Once the physical inspection 114 has taken place and the payload has been cleared, the inspecting authorities will preferably attach a new RFID tag which accounts for any weight discrepancies 118 and the vehicle will now be reclassified as a low risk 120 and proceed.

Figure 2:
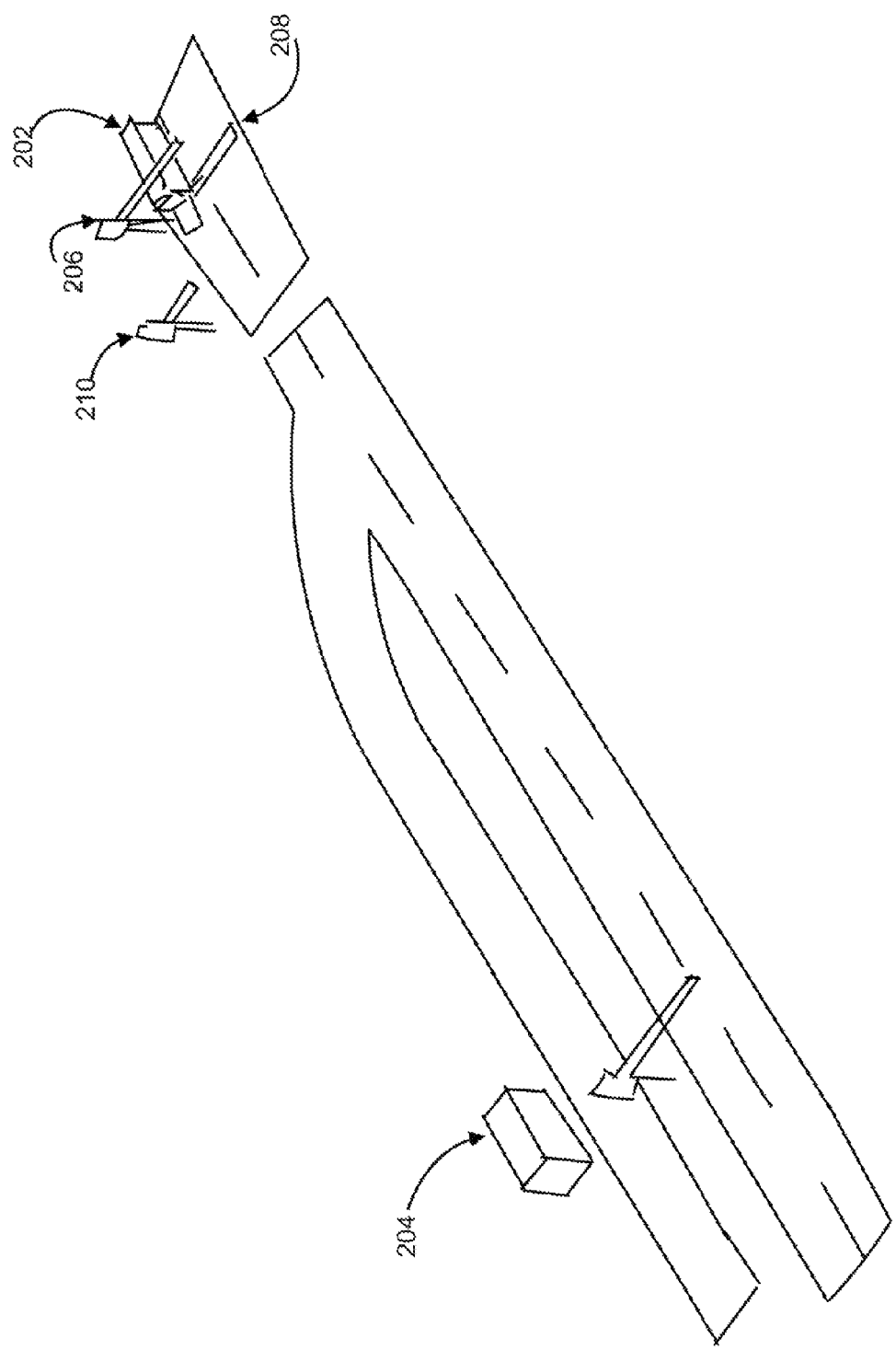
FIG. 2 shows a functional configuration in accordance with an embodiment of the present invention.

With reference now to FIG. 2, a functional configuration according to an embodiment of the present invention will now be discussed. Preferably, a truck is equipped with an RFID reader to first poll the RFID data while in transit. This data is collected and processed via the monitoring unit controller which is preferably configured to calculate the total RFID weight. This data is then stored for comparison during a later measuring event.

As further shown in FIG. 2, the Truck 202 may be assigned a small wireless transponder that mounts onto the vehicles' windshield. As the truck approaches an AVI-equipped weigh station 204, an electronic reader on a boom 206 over the road automatically scans the transponder and identifies the vehicle. A secure AVI computer located inside the scale house accesses the vehicle information associated with the transponder, and validates it to ensure compliance with state requirements. At the same time, weigh in motion (WIM) scales 208 may be used to verify that the truck's configuration and gross vehicle weights are within acceptable limits. At this point, after the vehicle weight has been measured, data may be automatically transmitted to the monitoring unit or manually input by driver, and the monitoring unit will compare RFID weight data to the measured payload weight data. Thereafter, the resulting information may be transmitted to the authorities and displayed via the display screen.

Finally, as the truck passes beneath a second boom 210, a signal indicating whether the vehicle may bypass is transmitted back to the transponder. If there are no discrepancies between the RFID weight data and the measured payload data and the vehicle's credentials, safety, and weight are all in order, a "green light" tells the driver to go ahead and by-pass the facility. If however, there are discrepancies between the RFID weight data and the measured payload weight data, the vehicles' information cannot be validated, or if it is selected for random manual inspection, then a high risk alert will trigger a "red-light" message that will alert the driver to stop. Once the physical inspection has taken place and the payload has been cleared, the inspecting authorities will preferably attach a new RFID tag which accounts for the weight discrepancies and the vehicle will now be reclassified as a low risk and allowed to proceed.

Figure 3:
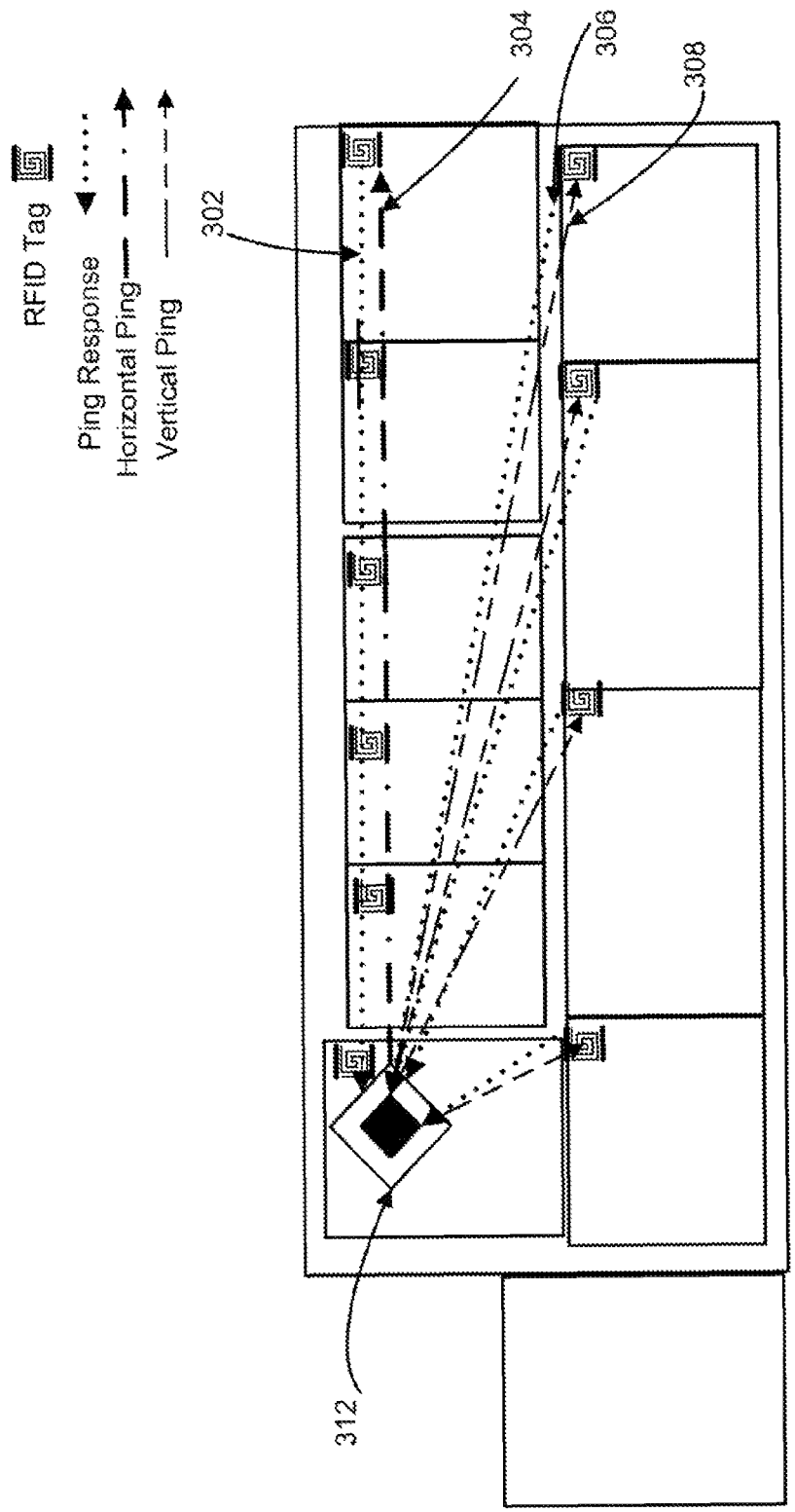
FIG. 3 is a functional configuration in accordance with an embodiment of the present invention.

With reference now to FIG. 3, a functional configuration in accordance with a further preferred embodiment of the present invention will now be discussed. As shown, by performing a time/distance calculation within a container and adding RFID tag data to the selected measurements, all the weight within a monitored container may be located and accounted for. In this manner, the precise location of unidentified or untagged weight may be determined. Further, unsafe distributions of weight may be identified and corrected.

Preferably, the location of an RFID tag can be determined by the distance and direction of the tag in relation to a reference point. The major techniques to derive these properties are received signal strength indicator (RSSI), time-of-arrival, time difference of arrival, angle-of-arrival, and deflection combined with signal strength, etc. In some RFID tracking and localization systems, two RFID antennas or one or more mobile RFID readers may be employed.

According to a preferred embodiment, the location and distribution of weight may be determined by having each RFID tagged item transmit a distinctly identifiable code or number which is then used to determine the gross weight of each tagged item. Thereafter, as shown in FIG. 3, the container monitoring unit 312 may send out a horizontal ping 304 from a built in RFID reader to the tagged items. Each tagged item's ping response 302 may then be used to determine a horizontal distance based on the time/distance relationship. Next, monitoring unit 312 may send out a vertically directed ping 308 to each monitored element. Each monitored element's vertical ping response 306 may then be used to determine a vertical distance. Alternatively, other distance measurement devices may also be used.

Thereafter, using the vertical and horizontal distance measurements, the controller unit 312 may map the location for all weight within the container. Further, the controller unit 312 may use the data to create a weight distribution for a specific container and compare the measured distribution against desired distributions.

The invention claimed is:

1. A system for a monitoring cargo container which is capable of transport by a vehicle and which is available to be weighed via a scale, the system comprising:
   a RFID reader that scans contents of the cargo container for RFID data regarding RFID tagged items in the cargo container;
   a processor that is configured to estimate a payload weight of the cargo container according to the RFID data, wherein the processor is further configured to compare the payload weight measured by the scale with the payload weight determined from the RFID data, and for determining a risk factor according to a comparison of the two weights; and a communication device, wherein the communication device signals an alert when the risk factor is high.

2. The system of claim 1, wherein the scale is a high-speed electronic scale embedded in a road.

3. The system of claim 1, wherein the system further comprises:
a transponder attached to the vehicle for automatic vehicle identification; and
an electronic reader communicatively coupled with the scale, wherein the electronic reader scans the transponder to identify information regarding the vehicle when the vehicle is weighed.

4. The system of claim 3, wherein the processor is configured to receive the vehicle identification, the payload weight measured by the scale, and the payload weight estimated by the RFID data; further wherein, the processor is further configured to establish a weight related risk profile based on the received information.

5. The system of claim 4, wherein the processor is located in a central station.

6. The system of claim 5, wherein the system is further configured to receive cargo content information collected by the RFID reader.

7. The system of claim 6, wherein the processor integrates the vehicle registration information, the payload weight measured by the scale, the payload weight estimated by the RFID data, and the cargo content information into a risk profile.

8. The system of claim 1, wherein the scale is provided within the vehicle transporting the cargo container.

9. The system of claim 1, wherein the system is configured to detect locations for RFID tagged items in the cargo container, further wherein the system is configured to map the location and weight for RFID tagged items and to estimate a weight distribution for the cargo container.

10. The system of claim 9, wherein the processor is configured to receive payload weight distribution data from a physical measurement of the container, wherein the processor is further configured to compare the measured weight distribution data with the payload weight distribution estimated by the RFID data.

11. A method for monitoring a cargo container which is capable of being transported by a vehicle and which is available to be weighed via a scale, the method comprising:
scanning the contents of the cargo container for RFID data from one or more RFID tagged items;
estimating a payload weight of the cargo container from the RFID data;
measuring a payload weight of the vehicle using a scale;
comparing the payload weight measured by the scale with the payload weight estimated from the RFID data;
determining a risk factor according to the differences between the two weights;
providing an alert when the risk factor is high.

12. The method of claim 11, wherein the scale is a high-speed electronic scale embedded in a road.

13. The method of claim 11, wherein the method further comprises: determining the identification of the vehicle from a transponder attached to the vehicle.

14. The method of claim 13, further comprising: receiving the vehicle identification, the vehicle registration information, the payload weight measured by the scale, and the payload weight estimated from the RFID data.

15. The method of claim 14, further comprising:
establishing a weight related risk profile using the vehicle identification, the payload weight measured by the scale, and the payload weight estimated from the RFID data.

16. The method of claim 15, further comprising:
determining cargo content information from RFID data.

17. The method of claim 16, further comprising:
integrating the vehicle registration information, the payload weight measured by the scale, the payload weight estimated from the RFID data, and the cargo contents information into a risk profile.

18. The method of claim 11, further comprising:
attaching a new RFID tag to items in the cargo container to account for weight discrepancies; and reclassifying the vehicle as a low risk.

19. The method of claim 11, further comprising:
determining a location of RFID tagged items in the cargo container;
mapping the location and weight for each RFID tagged item; and
estimating a weight distribution for the cargo container.

20. The method of claim 19, further comprising:
determining a weight distribution for the cargo container;
comparing the payload weight distribution measured by the scale with the payload weight distribution estimated by the RFID reader; and
determining whether the two weight distributions match with each other.

21. The method of claim 11, further comprising:
determining the weight of a missing item based on a comparison of the payload weight measured by the scale and the payload weight estimated from the RFID data.

22. The method of claim 21, further comprising:
determining the identity of a missing item based on comparing the determined weight of the missing item with additional cargo content information.

* * * * *